United States Patent [19]

Anton

[11] Patent Number: 4,680,222

[45] Date of Patent: Jul. 14, 1987

[54] PROCESS AND DEVICE FOR ELECTRIC WINDING INSULATION BY IMPREGNATION, AND STABILIZED VARNISH WITHOUT SOLVENT USABLE THEREIN

[75] Inventor: Alain Anton, Chaponnay, France

[73] Assignee: Alsthom-Atlantique, S.A., Paris Cedex, France

[21] Appl. No.: 630,598

[22] Filed: Jul. 13, 1984

[30] Foreign Application Priority Data

Jul. 13, 1983 [FR] France ............................ 83 11723

[51] Int. Cl.$^4$ .................. H01B 3/04; H01B 3/08; H01B 3/40; H01B 17/60
[52] U.S. Cl. .................................. 428/251; 156/53; 156/55; 174/120 C; 174/120 SR; 174/121 SR; 174/122 G; 427/386; 427/389.8; 427/407.3; 428/285; 428/324; 428/422.8; 525/528; 528/52; 528/73
[58] Field of Search ............... 525/528; 528/52, 73; 427/386, 389.8, 407.3; 156/53, 55; 428/251, 285, 324, 422.8

[56] References Cited

U.S. PATENT DOCUMENTS

| 3,020,262 | 2/1962 | Speranza . | |
|---|---|---|---|
| 3,313,747 | 8/1967 | Schramm . | |
| 3,334,110 | 4/1967 | Schramm . | |
| 3,876,618 | 4/1975 | Clarke . | |
| 4,070,416 | 1/1978 | Narahara et al. | 528/73 |
| 4,222,802 | 9/1980 | Sakai et al. | 528/75 |
| 4,424,316 | 1/1984 | DiSalvo et al. | 525/528 |
| 4,477,642 | 10/1984 | Geist et al. | 525/528 |
| 4,486,556 | 12/1984 | Kordomenos et al. | 525/528 |
| 4,504,633 | 3/1985 | DiSalvo et al. | 525/528 |

FOREIGN PATENT DOCUMENTS 78424 5/1982 Japan ................................ 428/285

OTHER PUBLICATIONS

*Chemical Abstracts,* 85 (2), 6351s, (1976).
Chemical Abstracts, vol. 85, No. 2, Jul. 12, 1976, p. 24, Abstract No. 6351s, Catalysts for Polyoxazolidone Manufacture, N. Kawasawa et al.

*Primary Examiner*—James C. Cannon
*Attorney, Agent, or Firm*—Kenyon & Kenyon

[57] ABSTRACT

Process for insulating by impregnation an electric winding with isocyanurate and oxazolidone cycles resins, in which one wraps around the conductors a glass cloth and porous mica paper tape loaded with a quaternary ammonium salt catalyzing the condensation of the isocyanate and epoxy compounds into isocyanurate and oxazolidone cycles, one impregnates the tape with a varnish containing an isocyanate compound and a liquid epoxy resin, then one subjects the impregnated tape to a varnish polymerization thermal treatment. One uses as a quaternary ammonium salt a benzyl-trialkylammonium halide with an alkyl chain containing at the most 3 carbon atoms.

14 Claims, No Drawings

PROCESS AND DEVICE FOR ELECTRIC WINDING INSULATION BY IMPREGNATION, AND STABILIZED VARNISH WITHOUT SOLVENT USABLE THEREIN

The present invention relates to a process of insulating by impregnation an electric winding with isocyanurate and oxazolidone cycle resins, in which one winds around the conductors a glass fiber cloth and porous mica paper tape loaded with a quaternary ammonium salt catalyzing the condensation of isocyanate and epoxy compounds into isocyanurates and oxazolidones, one impregnates the tape with a varnish including an isocyanate compound and a liquid epoxy resin, then one subjects the impregnated tape to a thermal treatment of varnish polymerization. Besides, it extends to an insulation device obtained by this process and to a varnish without solvent utilizable in this process and device.

It was already proposed in documents FR-A Nos. 2207952, 2242419 and 2427673 to manufacture an electric winding insulation by condensation of an isocyanate compound and an epoxy compound in the presence of a catalyzer favoring the formation of isocyanurate and oxazolidone cycles, this catalyzer being constituted by a quaternary ammonium salt containing a long chain alkyl radical with at least 8 carbon atoms.

According to document FR-A No. 2427673, it was also proposed to incorporate a hardening catalyzer of the imidazole group in a mica tape of a glass support, impregnated with a silicon resin and dried, to impregnate the obtained insulating tape with a varnish made from a mixture of isocyanate and epoxy compounds, then to harden it by heating. However, the quaternary ammonium salts containing a long chain alkyl radical are very soluble in the tape impregnation resin, so they easily migrate from the tape into the impregnation bath and produce a premature varnish viscosity increase during the impregnation operation, which is achieved by alternate successive steps of putting under vacuum, then under pressure, which entails a more difficult and imperfect impregnation. Besides, the varnishes without solvent based on isocyanate and epoxy compounds present a progressive viscosity increase on storage, which reduces their possible conservation duration in drums and in tanks.

Therefore, the invention has as an object to supply a process permitting to avoid any premature viscosity increase of the tape impregnation resin and thus to ensure a comparatively easy and perfectly homogeneous impregnation, as well as a device obtained by this process. A further object of the invention is to permit the conversion of isocyanate and epoxy compounds based varnishes during long storage periods prior to their utilization.

The process according to the invention is characterized by the fact that there is used as the quaternary ammonium salt catalyzer a benzyl-trialkylammonium halide with an alkyl chain containing at the most 3 carbon atoms.

It further comprises preferably at least one of the following characteristics:

The benzyl-trialkylammonium halide is the benzyl-trimethylammonium chloride or the benzyl-triethylammonium chloride.

One incorporates the benzyltrialkylammonium halide in the solid state to the glass cloth and porous mica paper tape.

The benzyl trialkylammonium halide makes up from 0.2 to 5% in weight of the final insulation varnish.

To the varnish is added a condensation inhibitor consisting of a mineral or organic acid, an organic anhydride or an organic compound catching $\pi$ electrons.

The inhibitor is maleic acid, phtalic anhydride or acetic anhydride, hydroquinone, benzoquinone or azobisisobutyrolactone.

The inhibitor quantity added to the varnish is between 0.02 and 1% in weight and preferably between 0.05 and 0.3% in weight.

The varnish includes 7 to 25 isocyanate equivalents for an epoxy equivalent.

The invention extends further to a varnish without solvent based on isocyanate compounds and liquid epoxy resins stabilized against viscosity increase during storage, characterized in that it contains from 0.02 to 1% in weight, and preferably from 0.05 to 0.3% in weight, in relation to the varnish total mass, of an inhibitor consisting in a mineral or organic acid or an organic anhydride or an organic compound catching $\pi$ electrons.

Preferably, the inhibitor is selected from the group consisting of phosphoric acid, maleic anhydride, acetic anhydride, phtalic anhydride, hydroquinone, benzoquinone and azobisisobutyrolactone.

As epoxy resin, it is possible to use:

the diglycidylether resins, the bisphenol A, bisphenol F resins in liquid form having few free hydroxyl groups, with an epoxy equivalent between 170 and 300.

the novolaque epoxy resins with an epoxy equivalent of 160 to 230 derived from phenol, cresol, cresylic acids, bisphenol A novolaques.

the liquid cycloaliphatic epoxy resins such as those commercialized by the Ciba-Geigy Company under the designations CY 192 or CY 179.

As diisocyanate compound, one may use:

diisocyanates such as the 4,4-diphenylmethane diisocyanate, the 2,4 and 2,6-toluene diisocyanate, the 3,5-naphtalene diisocyanate, the 1,4-cyclohexane diisocyanate, the triphenylmethane triisocyanate, the tetraisocyanate of 3,3'-4,4' diphenylmethane.

The isocyanates can be used alone or mixed.

The advantage of using benzyl-trimethylammonium chloride as a catalyzer resides in its total unsolubility in the impregnation varnish up to a 100° C. temperature. The benzyl-triethylammonium chloride can also advantgeously be used, but it offers a slight solubility in the impregnation varnish around 60° C.

The insulation device by impregnation of an electric winding according to the invention, including a glass cloth and porous mica paper tape loaded with a quaternary ammonium salt catalyzing the condensation of isocyanate and epoxy compounds into isocyanurate and oxazolidone cycles, impregnated with a varnish made up from an isocyanate compound and a liquid epoxy resin, hardened by thermal treatment in the presence of a quaternary ammonium salt, is characterized in that the quaternary ammonium salt is a halide of benzyl-trialkylammonium with an alkyl chain containing at the most 3 carbon atoms.

The following examples describe some modes of carrying out the invention.

The physical and mechanical characteristics of the impregnation resins of examples 1 to 8 below, and the electric characteristics of the insulators after impregnation and polymerization, are respectively given in the tables I and II following them. Percentages are indicated in weight.

EXAMPLE 1

We impregnate a "porous" called tape made from mica paper and a glass cloth bonded by an epoxy resin on the mica paper, containing 1 g/m² of benzyltrimethylammonium chloride, with a varnish composed from:

| | |
|---|---|
| 4,4' - diphenylmethane diisocyanate | 92,9% |
| bisphenol A epoxy resin (epoxy equivalent 178) | 7% |
| maleic anhydride | 0,1% |

EXAMPLE 2

We impregnate the same tape as in example 1 with the varnish composed from:

| | |
|---|---|
| 4,4' - diphenylmethane diisocyanate | 92,9% |
| novolaque epoxy resin (epoxy equivalent 172) | 7% |
| maleic anhydride | 0,1% |

EXAMPLE 3

We impregnate the same tape as in example 1 with the varnish composed from:

| | |
|---|---|
| 4,4' - diphenylmethane diisocyanate | 79,8% |
| bisphenol A epoxy resin (epoxy equivalent 178) | 20% |
| maleic anhydride | 0,2% |

EXAMPLE 4

We impregnate the same tape as in example 1 with the varnish composed from:

| | |
|---|---|
| 2,4 - toluene diisocyanate 80% in weight } 2,6 - toluene diisocyanate 20% in weight | 92,9% |
| bisphenol A epoxy resin | 7% |
| phtalic anhydride | 0,1% |

EXAMPLE 5

We impregnate the same tape as in example 1 with the varnish composed from:

| | |
|---|---|
| 2,4 - toluene diisocyanate 80% in weight } 2,6 - toluene diisocyanate 20% in weight | 92,8% |
| novolaque epoxy resin (epoxy equivalent 170) | 7% |
| acetic anhydride | 0,2% |

EXAMPLE 6

We impregnate the same tape as in example 1 with the varnish composed from:

| | |
|---|---|
| 4,4' - diphenylmethane diisocyanate | 92,9% |
| novolaque epoxy resin (epoxy equivalent 170) | 4,7% |
| bisphenol A epoxy resin (epoxy equivalent 178) | 2,3% |
| maleic anhydride | 0,1% |

EXAMPLE 7

We impregnate the same tape as in example 1 with the varnish composed from:

| | |
|---|---|
| 4,4' - diphenylmethane diisocyanate | 92,9% |
| alicyclic epoxy resin (epoxy equivalent 170) | 7% |
| phtalic anhydride | 0,1% |

EXAMPLE 8

We impregnate the same tape as in example 1 with the varnish composed from:

| | |
|---|---|
| 2,4 - toluene diisocyanate 80% in weight } 2,6 - toluene diisocyanate 20% in weight | 79,8% |
| novolaque epoxy resin (epoxy equivalent 170) | 20% |
| maleic anhydride | 0,2% |

TABLE I

QUATERNARY AMMONIUM SALT CATALYZED VARNISHES CHARACTERISTICS

| | VISCOSITY at 20° C. | Loss of weight after 1000 H at 230° C. in air | Loss of weight after 1000 H at 230° C. in nitrogen | Initial lengthening measured at 230° C. | Lengthening after 1000 H at 230° C. measured at 230° C. | Initial tensile strength Measurement at 200° C. (Kg/cm²) | Tensile strength after 1000 H at 230° C. measurement at 200° C. (Kg/cm²) |
|---|---|---|---|---|---|---|---|
| Example 1 | 170 cpO | 5.5% | 2.7% | 4% | 4% | 540 | 525 |
| Example 2 | 205 cpo | 5.0% | 2.1% | 3% | 3% | 590 | 560 |
| Example 3 | 265 cpo | 6.2% | 3.1% | 5% | 4% | 480 | 470 |
| Example 4 | 12 cpo | 7.8% | 4.3% | 4% | 3% | 470 | 310 |
| Example 5 | 20 cpo | 6.9% | 4.0% | 4% | 3% | 500 | 320 |
| Example 6 | 190 cpo | 5.1% | 2.2% | 4% | 3% | 560 | 530 |
| Example 7 | 150 cpo | 7% | 3.4% | 6% | 4% | 460 | 430 |
| Example 8 | 30 cpo | 6.1% | 3.0% | 4% | 3% | 490 | 470 |

TABLE II

| | TAPE + IMPREGNATED AND POLYMERIZED VARNISH ELECTRIC CHARACTERISTICS | | | | |
|---|---|---|---|---|---|
| | | | Dielectric constant | | |
| | tg δ 200° C. under 1.2 kV initial | tg δ 230° C. under 1.2 kV initial | ε at 200° C. under 1.2 kV initial | ε at 230° C. under 1.2 kV initial | tg δ at 200° C. under 1.2 kV after 1000 H at 230° C. |
| Example 1 | 0.097 | 0.18 | 4.5 | 5.2 | 0.078 |
| Example 2 | 0.083 | 0.15 | 4.3 | 5.0 | 0.069 |
| Example 3 | 0.14 | 0.21 | 5.3 | 5.6 | 0.10 |
| Example 4 | 0.10 | 0.22 | 4.6 | 5.3 | 0.087 |
| Example 5 | 0.096 | 0.17 | 4.7 | 5.2 | 0.085 |
| Example 6 | 0.090 | 0.16 | 4.3 | 5.0 | 0.071 |
| Example 7 | 0.31 | 0.41 | 5.8 | 6.2 | 0.27 |
| Example 8 | 0.085 | 0.19 | 4.3 | 5.5 | 0.071 |

EXAMPLE 9

We prepare a varnish composed from:

| | |
|---|---|
| 4,4' - Diphenyl methane diisocyanate | 92% in weight |
| bisphenol A epoxy resin | 7% |
| benzoquinone | 1% |

This varnish presents only a small viscosity variation after a 100 days of storage at ambient temperature, whilst we observe for the same varnish which does not contain benzoquinone, a viscosity doubling in 40 days.

This varnish may be used to impregnate a porous tape made from mica paper and glass cloth bonded by an epoxy resin on the mica paper, containing 1 g/m² of benzyltrimethylammonium chloride, instead of the varnishes stabilized by an organic anhydride of examples 1 to 8.

EXAMPLE 10

We prepare a varnish composed from:

| | |
|---|---|
| 2,4 - toluene diisocyanate 80% in weight | |
| 2,6 - toluene diisocyanate 20% in weight | 92,9% in weight |
| bisphenol A epoxy resin | 10% |
| benzoquinone | 1% |

This varnish does not present viscosity evolution after 100 days of storage at ambient temperature, whilst we observe for the same varnish without benzoquinone a viscosity doubling in 40 days.

This varnish may be used as the one of example 9.

EXAMPLE 11

We prepare a varnish composed from:

| | |
|---|---|
| 4,4' - diphenyl methane diisocyanate | 92% in weight |
| novolaque epoxy resin (epoxy equivalent 170) | 7% |
| benzoquinone | 1% |

It presents only a small viscosity variation, whilst we observe for the same varnish without benzoquinone a viscosity doubling in less than 15 days.

This varnish may be used as those of examples 9 and 10.

EXAMPLE 11

Impregnation and polymerization cycle of a porous tape impregnated with a varnish according to one of examples 1 to 10:

A copper bar, of cross section 25×10 mm², covered with five layers at half overlapping of porous tape loaded with catalyzer, jammed in a slit of cross-section 28.8×12.8 mm², is placed into an impregnation vessel where it is left to degas for 15 hours vacuum at ambient temperature.

Then, without stopping the vacuum, we introduce into the vessel a sufficient quantity of varnish so that the slit is submerged in the varnish for at least one hour.

The vessel is then restored to atmospheric pressure, then set under a 6 bars pressure during at least one hour.

The cycle setting under vacuum—setting under pressure is performed three times in succession, then is completed by coming back to atmospheric pressure on the end of the third setting under pressure phase.

During the whole cycles duration, the salt must be sunk into the varnish.

We then perform resin polymerization by placing the slit containing the impregnated bar into a stove where it is subjected to the temperature of 130° C. in 1,30 hour. After a 2-hour stay at 130° C., the temperature is raised to 150° C. where there is a stay of four hours.

Treatment is completed by a 15 hours of post-baking at 200° C.

I claim:

1. A process of insulating a winding of electrical conductors with isocyanurate and oxazolidone cycle resins, the process comprising wrapping around the conductors a glass cloth and porous mica paper tape loaded with a quaternary ammonium salt for catalyzing the condensation of isocyanate and epoxy compounds, impregnating the tape with a solvent-free varnish containing an isocyanate compound and a liquid epoxy resin, and then subjecting the impregnated tape to a varnish polymerization thermal treatment, wherein said quaternary ammonium salt is a benzyl-trialkylammonium halide with an alkyl chain containing 3 carbon atoms at the most.

2. Process according to claim 1, characterized in that the benzyl-trialkylammonium halide is the benzyl-trimethylammonium chloride or the benzyl-triethylammonium chloride.

3. Process according to claim 1, characterized in that the benzyl-trialkylammonium halide is incorporated in the solid state to the glass cloth and porous mica paper tape.

4. Process according to claim 1, characterized in that the benzyl-trialkylammonium halide makes up from 0.2 to 5% in weight of the varnish.

5. Process according to claim 4, characterized in that the benzyl-trialkylammonium proportion is from 0.8 to 1.5% in weight of the varnish.

6. Process according to claim 1, characterized in that the varnish has added thereto a condensation inhibitor selected from the group consisting of mineral acids, organic acids, organic anhydrides and organic compounds catching $\pi$ electrons.

7. Process according to claim 6, characterized in that the inhibitor is selected from the group consisting of maleic anhydride, phtalic anhydride, acetic anhydride, hydroquinone, benzoquinone and azobisisobutyrolactone.

8. Process according to claim 6, characterized in that the quantity of inhibitor added to the varnish is between 0.02% and 1% in weight.

9. Process according to claim 8, characterized in that the quantity of inhibitor added to the varnish is between 0.05% and 0.3% in weight.

10. Process according to claim 1, characterized in that the varnish includes 7 to 25 isocyanate equivalents for an epoxy equivalent.

11. An insulation device formed by impregnation of an electric winding, including a glass cloth and porous mica paper tape loaded with a quaternary ammonium salt catalyzing the condensation of isocyanate and epoxy compounds into isocyanurate and oxazolidone cycles, with a solvent-free varnish made from an isocyanate compound and a liquid epoxy resin, and hardened by thermal treatment in the presence of the quaternary ammonium salt, characterized in that the quaternary ammonium salt is a benzyl-trialkylammonium halide with an alkyl chain containing at the most 3 carbon atoms.

12. Device according to claim 11, characterized in that the benzyl-trialkyl-ammonium halide is the benzyl-trimethylammonium chloride or the benzyl-triethylammonium chloride.

13. Device according to claim 11, characterized in that a condensation inhibitor is added to the varnish selected from the group consisting of a mineral, an organic acid, an organic anhydride, and an organic compound catching $\pi$ electrons.

14. Device according to claim 11, characterized in that the varnish contains 7 to 25 isocyanate equivalents for an epoxy equivalent.

* * * * *